(12) United States Patent
Barone et al.

(10) Patent No.: US 11,203,341 B2
(45) Date of Patent: Dec. 21, 2021

(54) METHOD TO CONTROL A ROAD VEHICLE FOR THE EXECUTION OF A STANDING START

(71) Applicant: FERRARI S.p.A., Modena (IT)

(72) Inventors: Alessandro Barone, Bologna (IT); Andrea Nannini, Modena (IT); Giacomo Senserini, Modena (IT); Stefano Marconi, Modena (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 17/017,246

(22) Filed: Sep. 10, 2020

(65) Prior Publication Data
US 2021/0094543 A1    Apr. 1, 2021

(30) Foreign Application Priority Data

Sep. 30, 2019   (IT) .......................... 102019000017522

(51) Int. Cl.
| | |
|---|---|
| *B60W 10/02* | (2006.01) |
| *B60W 30/18* | (2012.01) |
| *B60W 10/10* | (2012.01) |
| *B60W 40/064* | (2012.01) |
| *B60W 40/105* | (2012.01) |

(52) U.S. Cl.
CPC ...... *B60W 30/18027* (2013.01); *B60W 10/02* (2013.01); *B60W 10/10* (2013.01); *B60W 40/064* (2013.01); *B60W 40/105* (2013.01); *B60W 2520/10* (2013.01); *B60W 2520/26* (2013.01); *B60W 2520/28* (2013.01)

(58) Field of Classification Search
None
See application file for complete search history.

(56) References Cited

U.S. PATENT DOCUMENTS

| | | | |
|---|---|---|---|
| 5,020,622 A | 6/1991 | Hrovat | |
| 8,175,785 B2 * | 5/2012 | Turski | B60W 50/082 701/82 |
| 9,067,593 B2 * | 6/2015 | Dufford | B60W 20/19 |

FOREIGN PATENT DOCUMENTS

| | | | |
|---|---|---|---|
| DE | 19653855 C1 | 4/1998 | |
| DE | 102005051145 A1 | 5/2007 | |
| DE | 102010014563 A1 | 10/2011 | |
| DE | 102017201483 A1 * | 8/2018 | ............ B60W 10/02 |
| EP | 3798475 A1 * | 9/2020 | |

(Continued)

OTHER PUBLICATIONS

European Search Opinion EP '475 (dated Year: 2020).*

(Continued)

*Primary Examiner* — Dirk Wright
(74) *Attorney, Agent, or Firm* — Cantor Colburn LLP

(57) ABSTRACT

A method to control a road vehicle for the execution of a standing start; the control method comprises the steps of: engaging a gear in a transmission while a corresponding clutch is open; progressively closing the clutch causing the clutch to transmit a torque that causes the rotation of at least a pair of drive wheels; determining a target slip of the drive wheels; cyclically determining a real slip of the of the drive wheels; and continuously modulating the torque transmitted by the clutch during the closing of the clutch based of a difference between the target slip of the drive wheels and the real slip of the of the drive wheels.

11 Claims, 3 Drawing Sheets

(56) References Cited

FOREIGN PATENT DOCUMENTS

FR    2955164 A3 *  7/2011  ............ B60W 10/02
WO    WO-2017044741 A1 *  3/2017  ............ B60W 10/12

OTHER PUBLICATIONS

European Search Report EP '475 (dated Year: 2020).*
Search Report issued in Italian Patent Application No. 201900017522, date of completion Mar. 31, 2020; 9 pages.

* cited by examiner

METHOD TO CONTROL A ROAD VEHICLE FOR THE EXECUTION OF A STANDING START

CROSS-REFERENCE TO RELATED APPLICATIONS

This Patent Application claims priority from Italian Patent Application No. 102019000017522 filed on Sep. 30, 2019, the entire disclosure of which is incorporated herein by reference.

TECHNICAL FIELD

The invention related to a method to control a road vehicle for the execution of a standing start.

The invention finds advantageous application in a drivetrain provided with a dual-clutch, servo-assisted transmission, to which explicit reference will be made in the description below without because of this loosing in generality.

PRIOR ART

A drivetrain provided with a dual-clutch, servo-assisted transmission comprises a pair of primary shafts, which are coaxial to one another, are independent of one another and are inserted inside one another; two coaxial clutches, each designed to connect a respective primary shaft to a drive shaft of an internal combustion engine; and at least one secondary shaft, which transmits the motion to the drive wheels and can be coupled to the primary shafts by means of respective gear trains, each defining a gear.

During a gear shift, the current gear couples the secondary shaft to a primary shaft, while the following gear couples the secondary shaft to the other primary shaft; as a consequence, the gear shift takes place by crossing the two clutches, namely by opening the clutch associated with the current gear and by simultaneously closing the clutch associated with the following gear.

There is a function (called "performance launch") which allows drivers to carry out an extremely high-performance standing start. This function, also known as "performance launch", is activated by drivers when the road vehicle is standing still (for example, by pressing a button) and requires that the electronic control units autonomously control the internal combustion engine (namely, the generation of the torque) and the drivetrain (namely, the modulation of the closing of the clutch upon pickup and the engagement of the following gears) in order to maximize the longitudinal acceleration in every moment. In particular, drivers, in order to activate the function called "performance launch", must simultaneously press the brake pedal and the accelerator pedal and the standing start of the road vehicle begins when the brake pedal is released (during the entire execution of the operation drivers must keep the accelerator pedal completely pressed).

The most complicated and delicate phase of the standing start definitely is the modulation of the closing of the clutch, since the clutch needs to be closed as quickly as possible, though without causing the drive wheels to slip to an excessive extent (a modest slip of the drive wheels is positive, as it allows the torque transmitted to the ground to be maximized).

The function known as "performance launch" currently entails previously establishing a torque value to be transmitted to the ground during the clutch closing phase and progressively closing the clutch having the clutch constantly transmit this previously established torque value. However, this operating mode does not always ensure that the longitudinal acceleration is maximized in every moment, since the actual tyre ability to transmit the torque to the ground is extremely variable in a way that cannot always be predicted with precision; for example, the same tyre on the same road surface can offer different performances depending on the state of wear of the tyre, depending on the temperature of the tyre and depending on the temperature of the road surface. This operating mode, in some unfavourable conditions, transmits too much torque, thus determining an excessive slip of the drive wheels (with an evident worsening of the performances compared to ideal performances), whereas, in other more favourable conditions, it transmits too little torque (thus, not allowing the ideal performances to be reached).

Patent DE19653855C1, patent application DE102005051145A1 and patent application DE102010014563A1 describe a method to control a road vehicle for the execution of a standing start, during which the clutch connecting the internal combustion engine to the drive wheels is controlled so as to grant to the drive wheels a given degree of slip.

DESCRIPTION OF THE INVENTION

The object of the invention is to provide a method to control a road vehicle for the execution of a standing start, said method not suffering from the drawbacks discussed above and, at the same time, being easy and economic to be implemented.

According to the invention there is provided a method to control a road vehicle for the execution of a standing start, according to the appended claims.

The appended claims describe preferred embodiments of the invention and form an integral part of the description.

BRIEF DESCRIPTION OF THE DRAWINGS

The invention will now be described with reference to the accompanying drawings, showing a non-limiting embodiment thereof, wherein.

PREFERRED EMBODIMENTS OF THE INVENTION

Figure 1:
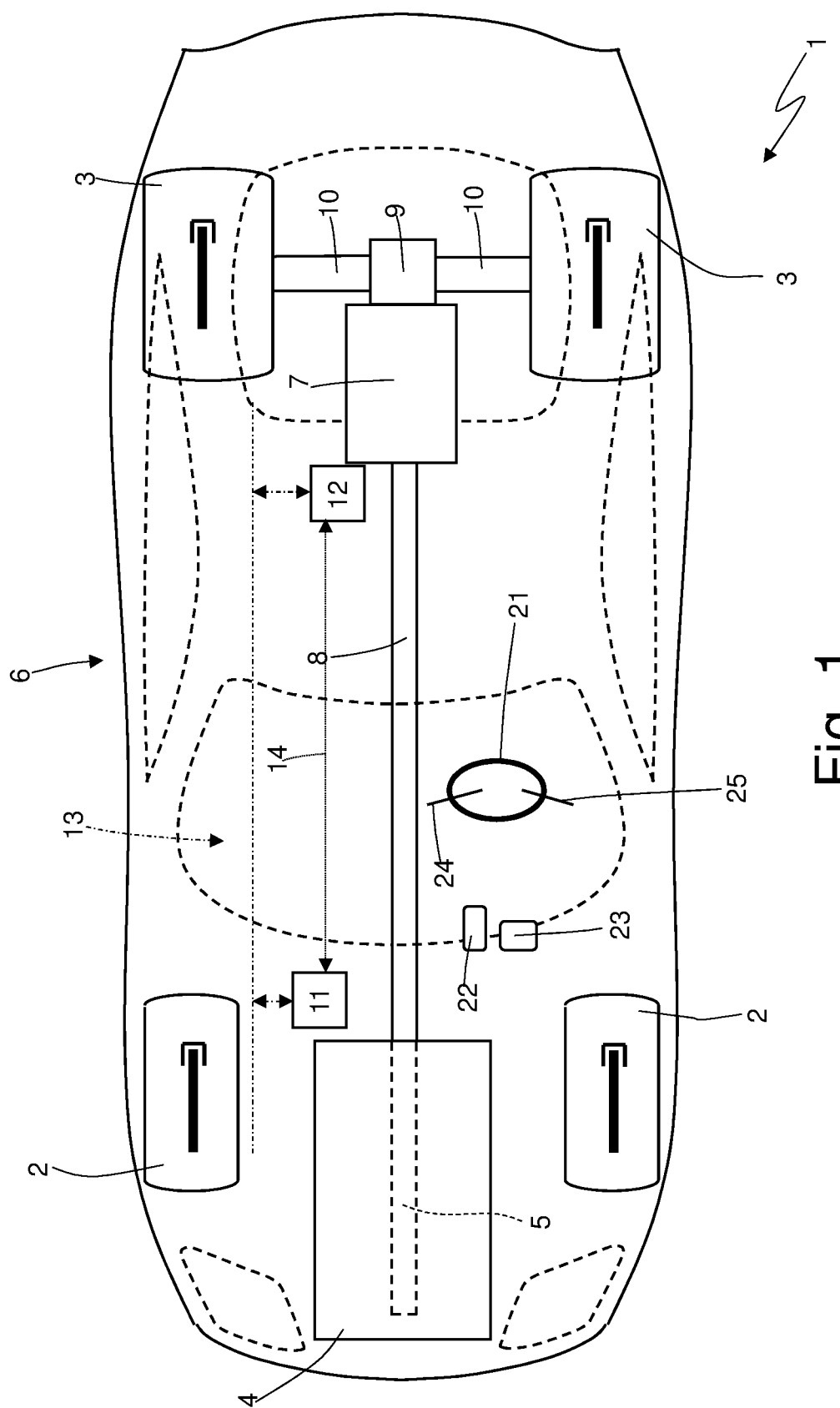
FIG. 1 is a schematic plan view of a rear-wheel drive road vehicle provided with a drivetrain with a dual-clutch, servo-assisted transmission, which is controlled according to the control method of the invention.

In FIG. 1, number 1 indicates, as a whole, a road vehicle (in particular, a car) provided with two front driven (namely, non-drive) wheels 2 and with two rear drive wheels 3. In a front position there is an internal combustion engine 4, which is provided with a drive shaft 5, which produces a torque, which is transmitted to the drive wheels 3 by means of a drivetrain 6. The drivetrain 6 comprises a dual-clutch, servo-assisted transmission 7 arranged in the rear-wheel-drive assembly and a transmission shaft 8, which connects the drive shaft 5 to an input of the dual-clutch, servo-assisted transmission 7. The dual-clutch, servo-assisted transmission 7 is connected, in a train-like manner, to a self-locking differential 9, from which a pair of axle shafts 10 start, each integral to a drive wheel 3.

The road vehicle 1 comprises a control unit 11 of the engine 4, which controls the engine 4, a control unit 12 of the drivetrain 6, which controls the drivetrain 6, and a BUS line 13, which is manufactured, for example, according to the CAN (Car Area Network) protocol, extends to the entire road vehicle 1 and allows the two control units 11 and 12 to communicate with one another. In other words, the control unit 11 of the engine 4 and the control unit 12 of the drivetrain 6 are connected to the BUS line 13 and, therefore, can communicate with one another by means of messages sent through the BUS line 13. Furthermore, the control unit 11 of the engine 4 and the control unit 12 of the drivetrain 6 can be directly connected to one another by means of a dedicated synchronization cable 14, which is capable of directly transmitting a signal from the control unit 12 of the drivetrain 6 to the control unit 11 of the engine 4 without the delays caused by the BUS line 13. Alternatively, the synchronization cable 14 could be absent and all communications between the two control units 11 and 12 could be exchanged using the BUS line 13.

Figure 2:
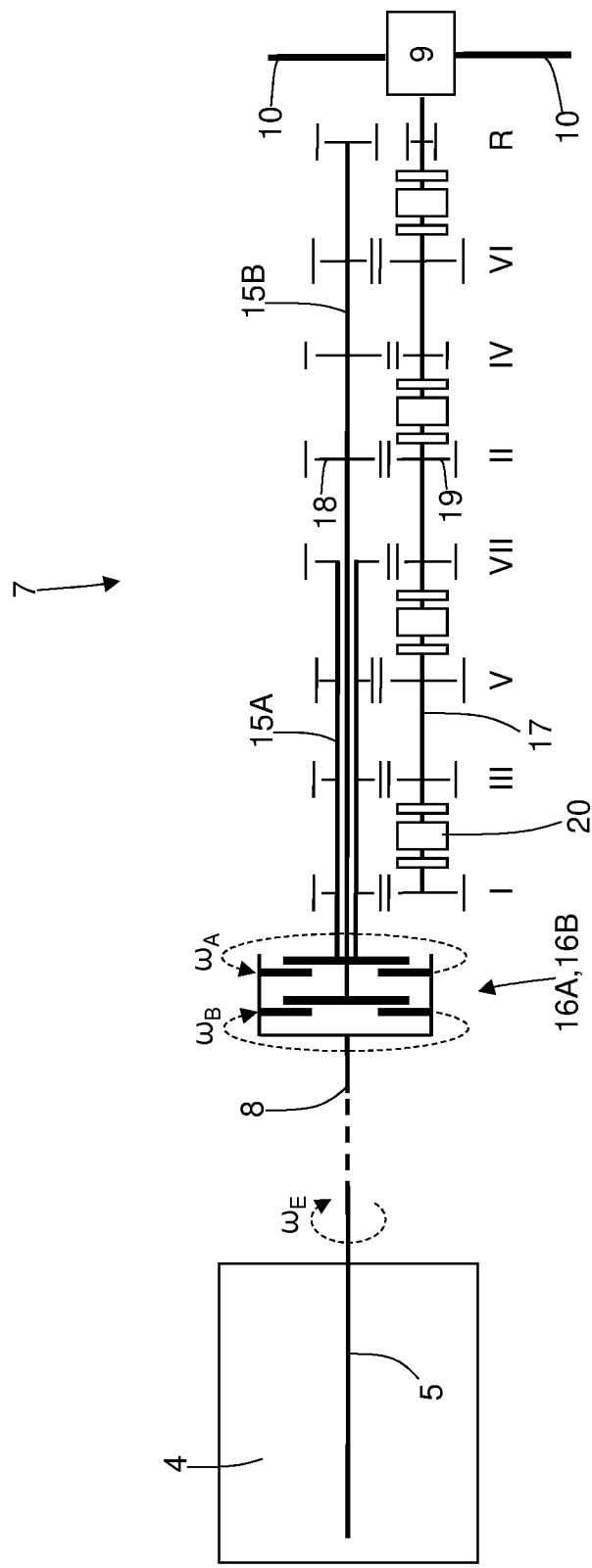
FIG. 2 is a schematic view of the drivetrain of FIG. 1.

According to FIG. 2, the dual-clutch, servo-assisted transmission 7 comprises a pair of primary shafts 15, which are coaxial to one another, independent of one another and inserted inside one another. Furthermore, the dual-clutch, servo-assisted transmission 7 comprises two coaxial clutches 16, each designed to connect a respective primary shaft 15 to the drive shaft 5 of the internal combustion engine 4 through the interposition of the transmission shaft 8; each clutch 16 is an oil bath clutch and, hence, is pressure-controlled (i.e. the degree of opening/closing of the clutch 16 is determined by the pressure of the oil inside the clutch 16); according to an alternative embodiment, each clutch 16 is a dry clutch and, hence, is position-controlled (i.e. the degree of opening/closing of the clutch 16 is determined by the position of a movable element of the clutch 16). The dual-clutch, servo-assisted transmission 7 comprises one single secondary shaft 17 connected to the differential 9 that transmits the motion to the drive wheels 3; according to an alternative and equivalent embodiment, the dual-clutch, servo-assisted transmission 7 comprises two secondary shafts 17, both connected to the differential 9.

The dual-clutch, servo-assisted transmission 7 has seven forward gears indicated with Roman numerals (first gear I, second gear II, third gear III, fourth gear IV, fifth gear V, sixth gear VI and seventh gear VII) and a reverse gear (indicated with R). The primary shaft 15 and the secondary shaft 17 are mechanically coupled to one another by a plurality of gear trains, each defining a respective gear and comprising a primary gear wheel 18 fitted on the primary shaft 15 and a secondary gear wheel 19 fitted on the secondary shaft 17. In order to allow for a correct operation of the dual-clutch, servo-assisted transmission 7, all odd gears (first gear I, third gear III, fifth gear V, seventh gear VII) are coupled to a same primary shaft 15, whereas all even gears (second gear II, fourth gear IV and sixth gear VI) are coupled to the other primary shaft 15.

Each primary gear wheel 18 is splined to a respective primary shaft 15, so as to always rotate with the primary shaft 15 in an integral manner, and permanently meshes with the respective secondary gear wheel 19; on the other hand, each secondary gear wheel 19 is mounted on the secondary shaft 17 in an idle manner. Furthermore, the dual-clutch, servo-assisted transmission 7 comprises four synchronizers 20, each mounted coaxial to the secondary shaft 17, arranged between two secondary gear wheels 19 and designed to be operated so as to alternatively fit the two respective secondary gear wheels 19 to the secondary shaft 17 (i.e. so as to alternatively cause the two respective secondary gear wheels 19 to become angularly integral to the secondary shaft 17). In other words, each synchronizer 20 can be moved in one direction to fit a secondary gear wheel 19 to the secondary shaft 17 or can be moved in the other direction to fit the other secondary gear wheel 19 to the secondary shaft 17.

The dual-clutch transmission 7 comprises one single secondary shaft 17 connected to the differential 9 that transmits the motion to the drive wheels 3; according to an alternative and equivalent embodiment, the dual-clutch transmission 7 comprises two secondary shafts 17, both connected to the differential 9.

According to FIG. 1, the road vehicle 1 comprises a passenger compartment housing a driving position for the driver; the driving position comprises a seat (which is not shown), a steering wheel 21, an accelerator pedal 22, a brake pedal 23 and two paddle shifters 24 and 25, which control the dual-clutch, servo-assisted transmission 7 and are connected to the opposite sides of the steering wheel 21. The upshift paddle shifter 24 is operated by the driver (by means of a short pressure) in order to request an upshift (namely, the engagement of a new gear, which is higher than the current gear and contiguous with the current gear), whereas the downshift paddle shifter 25 is operated by the driver (by means of short pressure) in order to request a downshift (namely, the engagement of a new gear, which is lower than the current gear and is contiguous with the current gear).

When the road vehicle 1 is standing still, the driver can activate (for example, by pressing a button) a function (technically known as "performance launch") which allows for an extremely high-performance standing start and requires that the electronic control unit 12 of the drivetrain 6 autonomously controls the internal combustion engine 4 (namely, establishes the torque to be generated by the internal combustion engine 4) and controls the drivetrain 6 (namely, the modulation of the closing of the clutch 16A upon pickup and the engagement of the following gears) in order to maximize the longitudinal acceleration in every moment. In particular, the driver, in order to activate the function called "performance launch", must simultaneously press the brake pedal 23 and the accelerator pedal 22 and the standing start of the road vehicle 1 begins when the brake pedal 23 is released (during the entire execution of the operation the driver must keep the accelerator pedal 22 completely pressed).

As long as the brake pedal 23 is pressed, the road vehicle 1 is obviously standing still, the control unit 12 of the drivetrain 6 causes the internal combustion engine 4 to run relatively slowly (about 2,000-3,000 revolutions/minute), engages the first gear I, with which the standing start begins, and slightly closes the clutch 16A (which engages the odd gears and, hence, also the first gear I, with which the standing start begins) so as to transmit, through the clutch 16A, a minimum torque other than zero (for example, ranging from 4 to 8 Nm) in order to pre-load the drivetrain 6 (namely, to recover all mechanical clearances). As soon as the brake pedal 23 is released, the control unit 12 of the drivetrain 6 increases the rotation speed of the internal combustion engine 4 and the torque generated by the internal combustion engine 4 and, at the same time, progressively closes the clutch 14A having the clutch 16A transmit a torque that causes the rotation of the two drive wheels 3.

Figure 3:
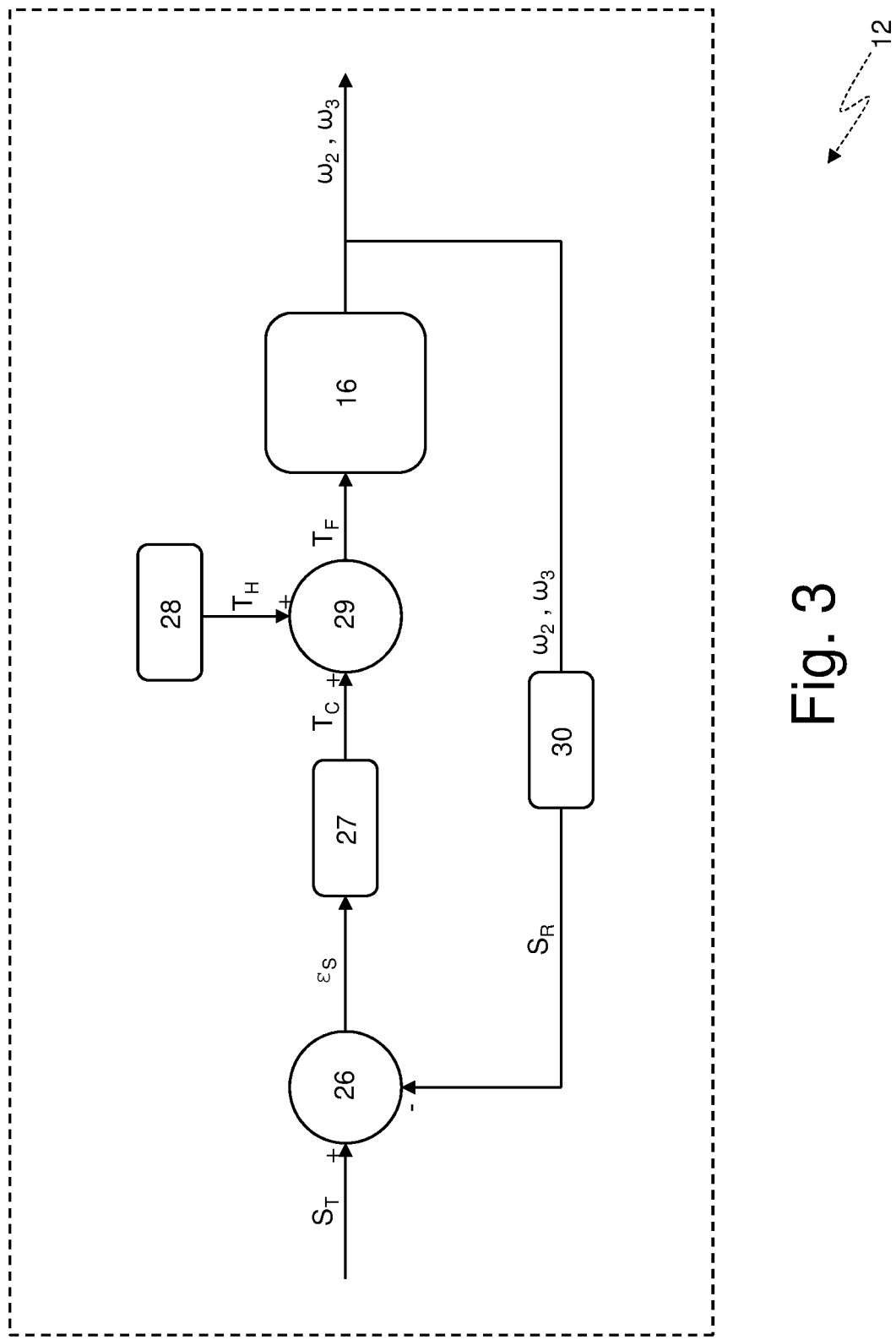
FIG. 3 is a block diagram of a control logic implemented in a control unit of the drivetrain.

In particular, according to FIG. 3, the control unit 12 of the drivetrain 6 cyclically determines a target slip $S_T$ of the drive wheels 3, cyclically determines a real slip $S_R$ of the drive wheels 3 during the standing start and, then, continuously modulates (varies) the torque transmitted by the clutch 16A during the closing of the clutch 16A based on a difference between the target slip $S_T$ of the drive wheels 3 and the real slip $S_R$ of the drive wheels 3. Preferably, the control unit 12 of the drivetrain 6 previously determines (namely, before beginning the standing start) an initial value of the torque transmitted by the clutch 16A during the closing of the clutch 16A and, then, modulates (varies) the torque transmitted by the clutch 16A during the closing of the clutch 16A starting from the previously established initial value.

In other words, the control unit 12 of the drivetrain 6 modulates the torque transmitted by the clutch 16A during the closing of the clutch 16A so as to pursue the target slip $S_T$ of the drive wheels 3, namely so as to allow the drive wheels 3 to always have the target slip $S_T$.

Obviously, if, during a relatively prolonged standing start, a following gear is engaged (for example, the second gear II, which, like all even gears, is controlled by the clutch 16B), the control unit 12 of the drivetrain 6 modulates the torque transmitted by the clutch 16B during the closing of the clutch 16B.

According to the preferred embodiment shown in FIG. 3, the control unit 12 of the drivetrain 6 implements a feedback control to modulate the torque transmitted by the clutch 16A during the closing of the clutch 16A; in the feedback control, the control error $\varepsilon_S$ is equal to the difference between the target slip $S_T$ of the drive wheels 3 and the real slip $S_R$ of the drive wheels 3. In particular, the feedback control entails the use of a subtracter block 26, which calculates the control error $\varepsilon_S$ carrying out the difference between the target slip $S_T$ of the drive wheels 3 and the real slip $S_R$ of the drive wheels 3, and also entails the use of a PID controller 27, which receives, as an input, the control error $\varepsilon_S$ and provides, as an output, a control signal $T_C$ corresponding to the real torque to be transmitted by the clutch 16A instant by instant.

Generally speaking, the target slip $S_T$ of the drive wheels 3 ranges from 0.1 to 0.2 (but it could also be slightly different), since a small slip of the tyres allows for a maximization of the torque transmitted by the tyres to the road surface.

According to a preferred, though non-binding embodiment, the control unit 12 of the drivetrain 6 determines a degree of grip of a road surface on which the road vehicle 1 rests and determines the initial value of the torque transmitted by the clutch 16A during the closing of the clutch 16A based on the degree of grip of the road surface. Generally speaking, the information on the degree of grip is available over the BUS line 13, since it is estimated (in a known manner) and shared by a brake control unit.

According to a preferred, though non-binding embodiment, the control unit 12 of the drivetrain 6 cyclically determines the target slip $S_T$ based on the degree of grip of the road surface (which can continuously change as the road vehicle 1 moves and, hence, as the road surface, on which it rests, changes). According to a possible embodiment, in the control unit 12 of the drivetrain 6 there is stored a map (generally obtained in an experimental manner), which provides the target slip $S_T$ of the drive wheels 3 based on the degree of grip of the road surface; obviously, the parameters of the map are set depending on the type of tyres mounted on the drive wheels 3. As a consequence, the degree of grip of the road surface can be used both to determine the initial value of the torque transmitted by the clutch 16A during the closing of the clutch 16A and to determine the target slip $S_T$.

According to an alternative embodiment, the target slip $S_T$ of the drive wheels 3 remains constant for the entire standing start and is previously established before the beginning of the standing start.

According to a possible embodiment, the control unit 12 of the drivetrain 6 stores, in a memory block 28, a final value $T_H$ of an integral contribution of the PID controller 27 at the end of a previous standing start and then, by means of an adder block 29, adds the final value $T_H$ of the integral contribution of the PID controller 27 at the end of a previous standing start to the control signal $T_C$ generated by the PID controller 27 during a following standing start. The corrected control signal $T_F$ obtained by adding the final value $T_H$ to the control signal $T_C$ is used to control the clutch 16A. In other words, the corrected control signal $T_F$ is obtained by adding a closed-loop contribution (namely, the control signal $T_C$ generated by the PID controller 27) to an open-loop contribution (namely, the final value $T_H$ of the integral contribution of the PID controller 27 at the end of a previous standing start). In this way, after having carried out a first (previous) standing start, it is possible to learn the actual correction that was necessary during the first (previous) standing start so as to begin the second (following) standing start from a starting point that requires less corrections. Obviously, during the first standing start the final value $T_H$ is zero.

It should be pointed out that the corrected control signal $T_F$ is converted into a corresponding pressure value by means of a conversion chart (known beforehand), since the clutches 16 are controlled based on the pressure (of the oil).

According to a preferred embodiment, the final value $T_H$ of the integral contribution of the PID controller 27 at the end of a previous standing start is considered only until the turning off of the road vehicle 1; namely, the turning off of the road vehicle 1 resets the final value $T_H$ (to zero). According to a different embodiment, the final value $T_H$ is reset (to zero) only after a given amount of time (for example twenty minutes) has elapsed since the previous standing start.

According to a different embodiment, the control unit 12 of the drivetrain 6 stores a mean value of the torque transmitted by the clutch 16A during the closing of the clutch 16A for a previous standing start and assumes that the initial value of the torque of a new start is equal to the mean value of the torque transmitted by the clutch 16A during the closing of the clutch 16A for a previous standing start. In this case, again, the mean value of the torque transmitted by the clutch 16A during the closing of the clutch 16A for a previous standing start is considered only until the turning off of the road vehicle 1 (or within a given amount of time since the previous standing start).

According to FIG. 3, a calculation block 30 is provided, which calculates the real slip $S_R$ of the drive wheels 3 by means of the following equation:

$$S_R = (\omega_3 - \omega_2)/\omega_2$$

$\omega_2$ speed of rotation corresponding to a longitudinal speed of the road vehicle 1;

$\omega_3$ speed of rotation of the drive wheels 3;

$S_R$ real slip of the of the drive wheels 3.

In particular, the speed $\omega_2$ of rotation corresponding to a longitudinal speed of the road vehicle 1 is equal to the speed $\omega_2$ of rotation of a pair of non-drive wheels 2.

What disclosed above can be applied, with no significant changes, even when the drivetrain 6 of the road vehicle 1 is provided with a single-clutch, servo-assisted transmission.

The control method described above has different advantages.

First of all, the control method described above allows drivers to always obtain the maximum acceleration possible during a standing start regardless of the actual surrounding conditions (for example, the temperature of the road surface, the temperature of the tyres, the state of wear of the tyres), since it always is capable of adjusting, in an ideal and quick manner, to the surrounding conditions, continuously modulating the torque transmitted by the clutch 16A during the closing of the clutch 16A based on the difference between the target slip $S_T$ of the drive wheels 3 and the real slip $S_R$ of the drive wheels 3.

Furthermore, the control method described above is easy and economic to be implemented as its execution requires a limited memory space and a reduced calculation ability.

LIST OF THE REFERENCE NUMBERS OF THE FIGURES 1 road vehicle
2 front wheels
3 rear wheels
4 engine
5 drive shaft
6 drivetrain
7 transmission
8 transmission shaft
9 differential
10 axle shafts
11 engine control unit
12 drivetrain control unit
13 BUS line
14 synchronization cable
15 primary shafts
16 clutches
17 secondary shaft
18 primary gear wheel
19 secondary gear wheel
20 synchronizers
21 steering wheel
22 accelerator pedal
23 brake pedal
24 upshift paddle shifter
25 downshift paddle shifter
26 subtracter block
27 PID controlled
28 memory block
29 adder block
30 calculation block
$\omega_2$ rotation speed
$\omega_3$ rotation speed
$S_R$ real slip
$S_T$ target slip
$\varepsilon_S$ control error
$T_C$ control signal
$T_H$ final value
$T_F$ corrected control signal

The invention claimed is:

1. A method to control a road vehicle (1) for the execution of a first standing start; the control method comprises the steps of:
engaging a gear in a transmission (7) of the road vehicle (1) while a corresponding clutch (16A) of the road vehicle (1) is open;
progressively closing the clutch (16A) causing the clutch (16A) to transmit a torque that causes the rotation of at least a pair of drive wheels (3) of the road vehicle (1);
determining a target slip ($S_T$) of the drive wheels (3);
cyclically determining a real slip of the ($S_R$) of the drive wheels (3); and
continuously modulating the torque transmitted by the clutch (16A) during the closing of the clutch (16A) based of a difference between the target slip ($S_T$) of the drive wheels (3) and the real slip of the ($S_R$) of the drive wheels (3);
wherein the torque transmitted by the clutch (16A) during the closing of the clutch (16A) is modulated, so as to pursue the target slip ($S_T$) of the drive wheels (3), by means of a feedback control in which a control error ($\varepsilon_S$) is the difference between the target slip ($S_T$) of the drive wheels (3) and the real slip of the ($S_R$) of the drive wheels (3);
wherein the torque transmitted by the clutch (16A) during the closing of the clutch (16A) is modulated by a PID controller (27) which receives, as an input, the control error ($\varepsilon_S$);
wherein a final value ($T_H$) of an integral contribution of the PID controller (27) is stored at the end of the first standing start; and
wherein the final value ($T_H$) of the integral contribution of the PID controller (27) at the end of the first standing start is added to a control signal ($T_C$) generated by the PID controller (27) during a second standing start subsequent to the first standing start.

2. The control method according to claim 1, wherein the final value ($T_H$) of the integral contribution of the PID controller (27) at the end of the first standing start is considered only until the turning off of the road vehicle (1).

3. The control method according to claim 1 and comprising the further steps of:
storing a mean value of the torque transmitted by the clutch (16A) during the closing of the clutch (16A) over the course of the first standing start; and
assuming, in a second standing start subsequent to the first standing start, that an initial value of the torque is equal to the mean value of the torque transmitted by the clutch (16A) during the closing of the clutch (16A) over the course of the first standing start.

4. The control method according to claim 3, wherein the mean value of the torque transmitted by the clutch (16A) during the closing of the clutch (16A) over the course of the first standing start is considered only until the turning off of the road vehicle (1).

5. The control method according to claim 1 and comprising the further steps of:
determining a speed ($\omega_3$) of rotation of the drive wheels (3);
determining a speed ($\omega_2$) of rotation corresponding to a longitudinal speed of the road vehicle (1); and
calculating the real slip of the ($S_R$) of the drive wheels (3) by means of the following equation:

$$S_R = (\omega_3 - \omega_2)/\omega_2$$

$\omega_2$ speed of rotation corresponding to a longitudinal speed of the road vehicle (1);
$\omega_3$ speed of rotation of the drive wheels (3);
$S_R$ real slip of the of the drive wheels (3).

6. The control method according to claim 5, wherein the speed ($\omega_2$) of rotation corresponding to a longitudinal speed of the road vehicle (1) is equal to the speed ($\omega_2$) of rotation of a pair of non-drive wheels (2).

7. The control method according to claim 1 and comprising the further steps of:
- determining a degree of grip of a road surface on which the road vehicle (1) rests;
- storing an initial value of the torque transmitted by the clutch (16A) during the closing of the clutch (16A) based on the degree of grip of the road surface; and
- cyclically determining the target slip ($S_T$) of the drive wheels (3) based on the degree of grip of the road surface.

8. The control method according to claim 1, wherein the target slip ($S_T$) of the drive wheels (3) ranges from 0.1 to 0.2.

9. A method to control a road vehicle (1) for the execution of a first standing start; the control method comprises the steps of:
- engaging a gear in a transmission (7) of the road vehicle (1) while a corresponding clutch (16A) of the road vehicle (1) is open;
- progressively closing the clutch (16A) causing the clutch (16A) to transmit a torque that causes the rotation of at least a pair of drive wheels (3) of the road vehicle (1);
- determining a target slip ($S_T$) of the drive wheels (3);
- cyclically determining a real slip of the ($S_R$) of the drive wheels (3);
- continuously modulating the torque transmitted by the clutch (16A) during the closing of the clutch (16A) based of a difference between the target slip ($S_T$) of the drive wheels (3) and the real slip of the ($S_R$) of the drive wheels (3);
- storing a mean value of the torque transmitted by the clutch (16A) during the closing of the clutch (16A) over the course of the first standing start; and
- assuming, in a second standing start subsequent to the first standing start, that an initial value of the torque is equal to the mean value of the torque transmitted by the clutch (16A) during the closing of the clutch (16A) over the course of the first standing start;
- wherein the torque transmitted by the clutch (16A) during the closing of the clutch (16A) is modulated so as to pursue the target slip ($S_T$) of the drive wheels (3).

10. The control method according to claim 9, wherein the mean value of the torque transmitted by the clutch (16A) during the closing of the clutch (16A) over the course of the first standing start is considered only until the turning off of the road vehicle (1).

11. A method to control a road vehicle (1) for the execution of a first standing start; the control method comprises the steps of:
- engaging a gear in a transmission (7) of the road vehicle (1) while a corresponding clutch (16A) of the road vehicle (1) is open;
- progressively closing the clutch (16A) causing the clutch (16A) to transmit a torque that causes the rotation of at least a pair of drive wheels (3) of the road vehicle (1);
- determining a target slip ($S_T$) of the drive wheels (3);
- cyclically determining a real slip of the ($S_R$) of the drive wheels (3);
- continuously modulating the torque transmitted by the clutch (16A) during the closing of the clutch (16A) based of a difference between the target slip ($S_T$) of the drive wheels (3) and the real slip of the ($S_R$) of the drive wheels (3);
- determining a degree of grip of a road surface on which the road vehicle (1) rests;
- storing an initial value of the torque transmitted by the clutch (16A) during the closing of the clutch (16A) based on the degree of grip of the road surface; and
- cyclically determining the target slip ($S_T$) of the drive wheels (3) based on the degree of grip of the road surface,
- wherein the torque transmitted by the clutch (16A) during the closing of the clutch (16A) is modulated so as to pursue the target slip ($S_T$) of the drive wheels (3).

* * * * *